(12) United States Patent
Gioia et al.

(10) Patent No.: US 9,971,302 B2
(45) Date of Patent: May 15, 2018

(54) METHOD FOR PROCESSING A SEQUENCE OF HOLOGRAPHIC IMAGES, DEVICES, SIGNALS, DEVICES AND COMPUTER PROGRAM ASSOCIATED THEREWITH

(71) Applicant: Orange, Paris (FR)

(72) Inventors: Patrick Gioia, Servon sur Vilaine (FR); Kartik Viswanathan, Rennes (FR)

(73) Assignee: ORANGE, Paris (FR)

( * ) Notice: Subject to any disclaimer, the term of this patent is extended or adjusted under 35 U.S.C. 154(b) by 142 days.

(21) Appl. No.: 15/107,844

(22) PCT Filed: Dec. 11, 2014

(86) PCT No.: PCT/FR2014/053293
§ 371 (c)(1),
(2) Date: Jun. 23, 2016

(87) PCT Pub. No.: WO2015/097358
PCT Pub. Date: Jul. 2, 2015

(65) Prior Publication Data
US 2016/0327905 A1 Nov. 10, 2016

(30) Foreign Application Priority Data
Dec. 23, 2013 (FR) ...................................... 13 63362

(51) Int. Cl.
*G03H 1/08* (2006.01)
*H04N 19/64* (2014.01)
*G03H 1/00* (2006.01)

(52) U.S. Cl.
CPC ......... *G03H 1/0808* (2013.01); *G03H 1/0005* (2013.01); *G03H 1/0866* (2013.01);
(Continued)

(58) Field of Classification Search
CPC ........................... H04N 19/647; G03H 1/0005
(Continued)

(56) References Cited

U.S. PATENT DOCUMENTS 5,701,132 A * 12/1997 Kollin .................. G02B 26/101
345/7
5,781,229 A * 7/1998 Zediker .................... H04N 5/74
250/206.1
(Continued)

FOREIGN PATENT DOCUMENTS

WO 0195016 A1 12/2001

OTHER PUBLICATIONS

International Search Report dated Apr. 17, 2015 for corresponding International Application No. PCT/FR2014/053293, filed Dec. 11, 2014.
(Continued)

*Primary Examiner* — Paulos M Natnael
(74) *Attorney, Agent, or Firm* — David D. Brush; Westman Champlin & Koehler, P.A.

(57) ABSTRACT

A method for processing a sequence of holographic images, with a view to its rendition by a holographic display device to at least one observer. A holographic image is decomposed over a Gabor wavelet basis into a set of wavelet coefficients. The method includes the following acts, implemented for an image of the sequence: obtaining items of information representative of the decomposition over the Gabor wavelet basis; obtaining of items of information representative of a location of the at least one observer in a reference frame of the display device; selecting a subset of wavelet coefficients as a function of the wavelet items of information and of the location items of information obtained.

12 Claims, 6 Drawing Sheets

Figure 1:
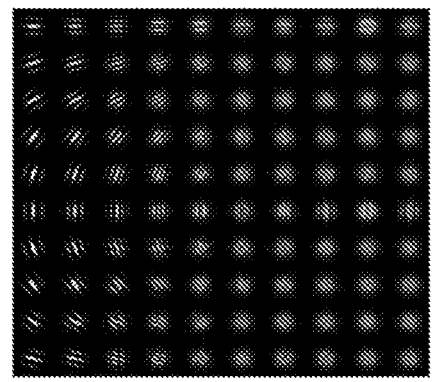

(52) U.S. Cl.
CPC ... *H04N 19/647* (2014.11); *G03H 2001/0088* (2013.01); *G03H 2001/0825* (2013.01); *G03H 2001/0883* (2013.01)

(58) Field of Classification Search
USPC .......................................... 348/40, 42, 51, 59
See application file for complete search history.

(56) References Cited

U.S. PATENT DOCUMENTS

| | | | | |
|---|---|---|---|---|
| 6,157,402 | A * | 12/2000 | Torgeson | G02B 27/225 348/42 |
| 7,053,925 | B2 * | 5/2006 | Payne | G02B 27/225 348/42 |
| 7,369,142 | B2 * | 5/2008 | Kondo | G06T 15/10 345/607 |
| 8,284,234 | B2 * | 10/2012 | Bjelkhagen | G02B 23/24 345/7 |
| 8,941,902 | B2 * | 1/2015 | Schwerdtner | G03H 1/08 359/9 |
| 2015/0268399 | A1 * | 9/2015 | Futterer | G02B 6/005 315/151 |

OTHER PUBLICATIONS

Viswanathan et al., "Wavelet compression of digital holograms: Towards a view-dependent framework", Proceedings of SPIE, vol. 8856. Sep. 26, 2013 (Sep. 26, 2013), p. 88561N, XP055145164.

Jingang Zhong et al., "Reconstruction of Digital Hologram by use of the Wavelet Transform", Feb. 28, 2011 (Feb. 28, 2011), XP055145173.

A. Schwerdtner et al., "Large holographic displays for real-time applications", Proceedings of SPIE, vol. 6912. Feb. 7, 2008 (Feb. 7, 2008), pp. 69120T-69120T-8, XP055145178.

Stephan Reichelt et al., "Holographic 3-D Displays—Electro-holography within the Grasp of Commercialization" Apr. 1, 2010 (Apr. 1, 2010), XP055149317.

Yamaguchi Takeshi et al., "Real-time image plane full-color and full-parallax holographic video display system", Optical Engineering. Soc. of Photo-Optical Instrumentation Engineers. Bellingham, vol. 46, No. 12, Dec. 28, 2007 (Dec. 28, 2007), pp. 125801-1-126801-3, XP007904171.

Viswanathan et al., "Morlet Wavelet transformed holograms for numerical adaptive view-based reconstruction", Proceedings of SPIE, vol. 9216. Sep. 19, 2014 (Sep. 19, 2014), p. 92160G. XP055149433.

Yang S et al. "A Progressive View-Dependent Technique for Interactive 3-D Mesh Transmission", IEEE Transactions on Circuits and Systems for Video Technology, IEEE Service Center, Piscataway, NJ, US, vol. 14, No. 11, Nov. 1, 2004 (Nov. 1, 2004), pp. 1249-1264, XP001211131.

Written Opinion dated Apr. 17, 2015 for corresponding International Application No. PCT/FR2014/053293, filed Dec. 11, 2014.

* cited by examiner

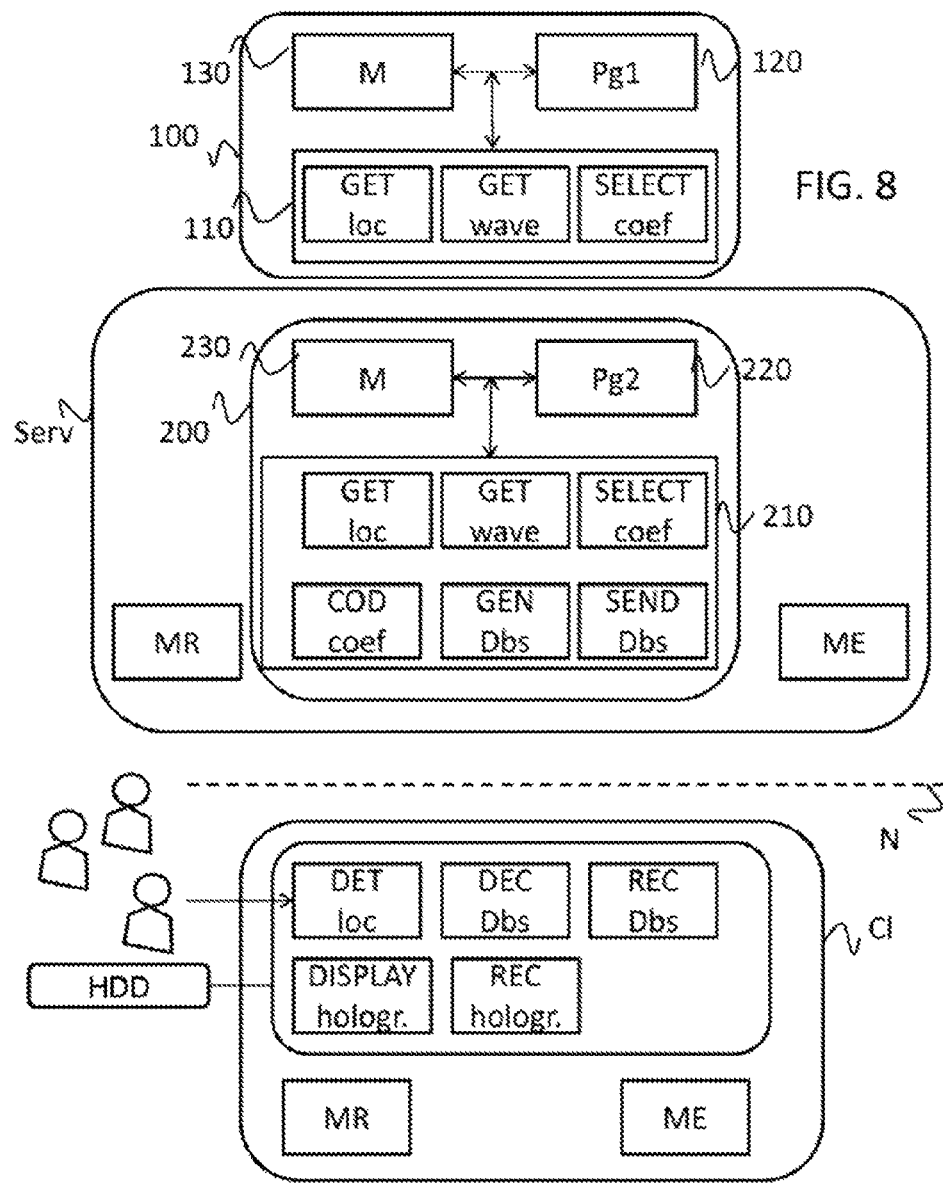

METHOD FOR PROCESSING A SEQUENCE OF HOLOGRAPHIC IMAGES, DEVICES, SIGNALS, DEVICES AND COMPUTER PROGRAM ASSOCIATED THEREWITH

CROSS-REFERENCE TO RELATED APPLICATIONS

This Application is a Section 371 National Stage Application of International Application No. PCT/FR2014/053293, filed Dec. 11, 2014, the content of which is incorporated herein by reference in its entirety, and published as WO 2015/097358 on Jul. 2, 2015, not in English.

FIELD OF THE INVENTION

The field of the invention is that of holography, in particular the generation of a sequence of holographic images intended to be transmitted by way of a communication network, and then rendered on a screen of a holographic display device.

Holography is a promising technology for displaying audiovisual contents in 3D with the help of a holographic display device.

BACKGROUND OF THE DISCLOSURE

One of the central problems relating to the practical implementation of such a holographic device is the considerable size of the data to be transmitted and displayed. A holographic image or hologram with a utilizable quality contains the items of information of several thousand perspectives of a scene at a given instant. If a sequence of images or video sequence is considered, this quantity of information must be multiplied by the refresh rate, thus culminating in bitrates well beyond the capacities of current networks.

The compression techniques customarily applied to conventional image sequences can be extended and generalized to encode holographic sequences; however, the very nature of holographic images prevents satisfactory results from being obtained since these techniques are generally based on block slicing and motion predictions; holographic images for their part take the form of diffraction patterns whose variations are almost entirely uncorrelated with the 3D scene that they represent.

A necessary expedient in the search for an efficient coding scheme is to identify the characteristics of the signal and the sources of the redundancies that may be found therein. This analysis leads to considering the local frequencies of the holographic patterns and consequently to favoring space/frequency decompositions, for which the decomposition functions used will have the best possible space/frequency location.

The use of a Gabor wavelet basis to decompose a holographic image for compression purposes is known from the document by Shortt, A. N, entitled "*Compression of digital holograms of 3d objects using wavelets*", published in 2006 in the journal *Optics Express*, page 2625. Gabor wavelets constitute one of the most efficient procedures for extracting the relevant items of information from a holographic signal.

However, regardless of the efficiency of the wavelet scheme chosen, the size of the data does not make it possible to achieve compression rates that are satisfactory in regard to transmission and real-time display on existing networks.

SUMMARY

These objectives, as well as others which will be apparent subsequently, are achieved with the aid of a method for processing a sequence of holographic images, with a view to its rendition by a holographic display device to at least one observer.

According to the invention, such a method is particular in that, for a holographic image, decomposed over a Gabor wavelet basis into a set of wavelet coefficients, it comprises the following steps:

Obtaining of items of information representative of the decomposition over the Gabor wavelet basis;

Obtaining of items of information representative of a location of said at least one observer in a reference frame of the display device, the items of information representative of a location of said at least one observer comprising parameters characteristic of a connected and convex subset of positions of the observer, termed the encompassing volume;

Selection of a subset of wavelet coefficients as a function of the wavelet items of information and of the location items of information obtained, said step comprising the following sub-steps:

determination of an angular direction of emission and of an angular dispersion of a light cone produced by a Gabor wavelet at a point of the holographic image in a reference frame of the display device;

identification of the cones having a non-zero intersection with at least the encompassing volume of said at least one observer;

selection of the wavelets corresponding to the identified cones.

The invention consists in utilizing the directional character of the spectrum associated with a Gabor wavelet and the relation between the frequency location of a Gabor wavelet and the direction of the light after diffraction through this wavelet at a point of the holographic image.

Knowing the zone or zones of location of one or more observers of the display device, the invention establishes which wavelets cause the emission of light diffracted in the direction of the observers and, in this way, contribute to reconstructing the sub-hologram seen by the observer or observers from their observation points. In this way, it selects a subset of relevant wavelet coefficients for the reconstruction of the visible sub-hologram for this or these observers on the display device. The other coefficients are not taken into account, thereby leading to the elimination of a non-negligible quantity of data, this quantity being all the more significant the more the number of observers is reduced.

Such a selection therefore makes it necessary to obtain beforehand items of information representative of the wavelet basis which is used for the decomposition of the holographic image and of a location of the observer or observers with respect to the holographic display device.

The invention therefore relies on an entirely novel and inventive approach to the processing of a sequence of holographic images, which utilizes the characteristic properties of Gabor wavelets to extract from a holographic image the relevant item of information to be coded and transmitted, as a function of the location of the observers of the holographic display device. The invention thus allows the generation of a data stream of reduced size more suitable for the bandwidth of current communication networks.

According to the invention, the item of information representative of a location of said at least one observer comprises parameters characteristic of a connected and convex subset of positions of the observer, termed the encompassing volume.

An encompassing volume such as this is for example a ball centered on a position of the observer at a given instant, whose radius is representative of a displacement of the observer during a predetermined time interval. This volume can also be a tile or any other connected and convex shape whose dimensions anticipate a displacement of this observer between two successive measurements of location and guarantee him comfortable viewing of the reconstructed holographic image.

According to the invention, the step of selecting a subset of coefficients comprises the following sub-steps:
  determination of an angular direction of emission and of an angular dispersion of a light cone produced by a Gabor wavelet at a point of the holographic image in a reference frame of the display device;
  identification of the cones having a non-zero intersection with at least the encompassing volume of said at least one observer;
  selection of the wavelets corresponding to the identified cones.

The incident light, when it passes through a Gabor wavelet at a point of the holographic image, produces a light cone in a direction which depends on the wavelet considered and of reduced angular aperture, which depends on the width of the frequency spectrum of the wavelet. Here it is a question of determining, for each cone, whether it has a non-zero intersection with the encompassing volume or volumes of the observers.

According to another aspect of the invention, the location items of information are received in a signaling message emitted by an entity designed to determine said location items of information.

In this embodiment of the invention, the processing method is implemented by a remote entity, for example a server entity. The selection of the relevant wavelet coefficients for the reconstruction of a holographic image is done by this server. On the other hand, the items of information regarding the location of the observer or observers with respect to the display device are determined locally, by an entity designed to determine the position of the observers at a current instant. This involves for example a receiver entity designed to receive measurements tracking an observer's position from a position tracking module ("headtracking") placed on the head of this observer. The receiver entity in question is designed to interpret the measurements received, deduce therefrom utilizable location items of information and transmit them via a communication network in a signaling message to an emitter or server entity, designed to utilize these items of information. Advantageously, the signaling message is transmitted in a return channel, of "back channel" type.

An advantage is that the emitter groups together all the intelligence from the processing of the sequence of holographic images before its optional coding, the design of the receiver therefore remaining simple and inexpensive.

According to another aspect of the invention, the processing method comprises a step of coding the wavelet coefficients with the aid of a tree of "zero-tree" type, according to which a wavelet coefficient is coded by an index representative of the wavelet in the wavelet basis and a value of the coefficient and a step of generating a data stream, comprising for a selected coefficient, said index and said value.

The zero-tree coding technique is very suitable for the coding of a subset of ordered coefficients. The data stream obtained by the invention is of reduced size and more suitable for the capacities of current communication networks.

According to another aspect of the invention, for a following image, the coded value of a selected coefficient comprises a variation with respect to the coded value for the previous image.

An advantage of the incremental coding is that it further reduces the size of the items of information to be transmitted.

According to another aspect of the invention, the processing method comprises a step of emitting a signaling message comprising the indices of the selected wavelet coefficients destined for a server entity able to generate a data stream coding said coefficients and a step of receiving a data stream coding the selected subset of wavelet coefficients originating from said server entity.

This processing method is implemented client or receiver side, that is to say holographic display device side. The selection of the relevant coefficients for the reconstruction of the sequence of holographic images for the observer or observers considered is therefore done as close as possible to the display device. It is thereafter transmitted in a signaling message by way of a return channel, for example of "back channel" type, to the server entity designed to generate the data stream coded from the holographic image sequence.

This embodiment is very suitable for client entities having significant processing capacities. An advantage is that it relieves the server by transferring part of the calculational load to the clients.

According to another aspect of the invention, subsequent to the obtaining of new location items of information, the step of selecting a subset of coefficients is repeated and the emitting step emits a new signaling message comprising the indices of the coefficients added to the subset and the indices of the coefficients deleted from the subset.

The subset of useful coefficients is not completely retransmitted at each new acquisition of location items of information, it is only updated.

The method for processing a sequence of holographic images which has just been presented in its various embodiments can be implemented by a device for processing a sequence of holographic images with a view to its rendition on a holographic display device to at least one observer.

According to the invention, such a device comprises the following units:
  Obtaining of items of information representative of the decomposition over the Gabor wavelet basis;
  Obtaining of items of information representative of a location of said at least one observer in a reference frame of the display device;
  Selection of a subset of wavelet coefficients as a function of the wavelet items of information and of the location items of information obtained.

The invention also relates to a device for coding a data stream representative of a sequence of holographic images. According to the invention, such a coding device comprises a processing device according to the invention and furthermore comprises the following units:
  coding of the wavelet coefficients with the aid of a tree of "zero-tree" type, a wavelet coefficient being coded by an index representative of the wavelet in the wavelet basis and a value of the coefficient;
  generation of a data stream comprising, for a selected coefficient, said index and said value.

The invention also relates to an entity for emitting a data stream representative of a sequence of holographic images comprising a coding device according to the invention, an emission module suitable for transmitting the data stream in a communication network and a reception module able to receive a carrier signal bearing a signaling message comprising the location items of information in respect of said at least one observer.

The invention relates furthermore to a device for decoding a data stream representative of a sequence of holographic images comprising a processing device according to the invention and furthermore comprising the following units:

decoding of the wavelet coefficients with the aid of a tree of "zero-tree" type, a wavelet coefficient being coded by an index representative of the wavelet in the wavelet basis and a value of the coefficient;

reconstruction of an image of the sequence, with the help of the decoded coefficients comprising, for a selected coefficient, said index and said value.

The invention also relates to an entity for receiving a data stream representative of a sequence of holographic images comprising a module for receiving location items of information in respect of said at least one observer in a reference frame of the holographic display device, a device for decoding the data stream according to the invention and a module for transmitting the reconstructed image to said display device.

The invention also relates to a carrier signal bearing a data stream comprising a first signaling message emitted by an entity for receiving a data stream coding a sequence of holographic images destined for an entity emitting said stream.

According to the invention, said message comprises items of information representative of a location of at least one observer in a reference frame of a holographic display device connected to said reception entity.

The invention also relates to a carrier signal bearing a data stream comprising a second signaling message emitted by an entity for receiving a data stream coding a sequence of holographic images destined for an entity emitting said stream. According to the invention, said message comprises the indices of the Gabor wavelet coefficients selected for the coding of at least one image of said holographic sequence.

The invention further relates to a computer program comprising instructions for the implementation of the steps of a method such as described above for processing a sequence of holographic images, when this program is executed by a processor. Such a program can use any programming language. It can be downloaded from a communication network and/or recorded on a computer readable medium.

The invention pertains finally to a storage medium, readable by a processor, integrated or not into the device for processing a delivery request according to the invention, optionally removable, storing a computer program implementing a method for generating a data stream such as described above.

The recording media mentioned hereinabove can be any facility or device capable of storing the program and readable by a terminal entity. For example, the media can comprise a storage means, such as a ROM, for example a CD ROM or a microelectronic circuit ROM, or else a magnetic recording means, for example a floppy disk or a hard disk.

Moreover, the recording media can correspond to a transmissible medium such as an electrical or optical signal, which can be conveyed via an electrical or optical cable, by radio or by other means. The programs according to the invention can in particular be downloaded from a network of Internet type.

LIST OF FIGURES

Figure 2A:
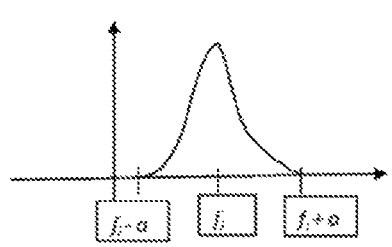
Figure 2B:
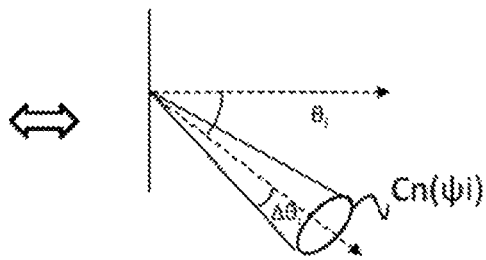
Figure 3A:
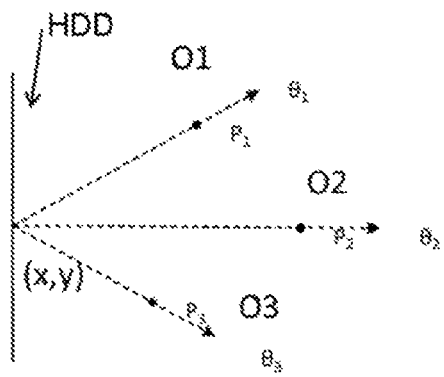
Figure 3B:
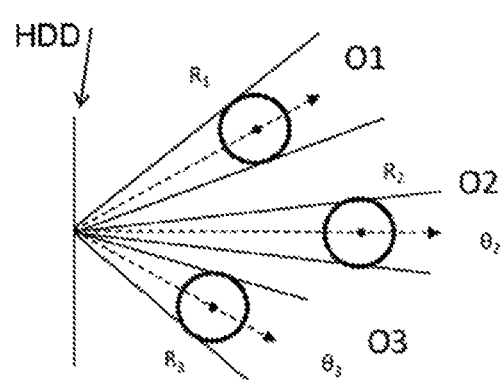
Figure 5:
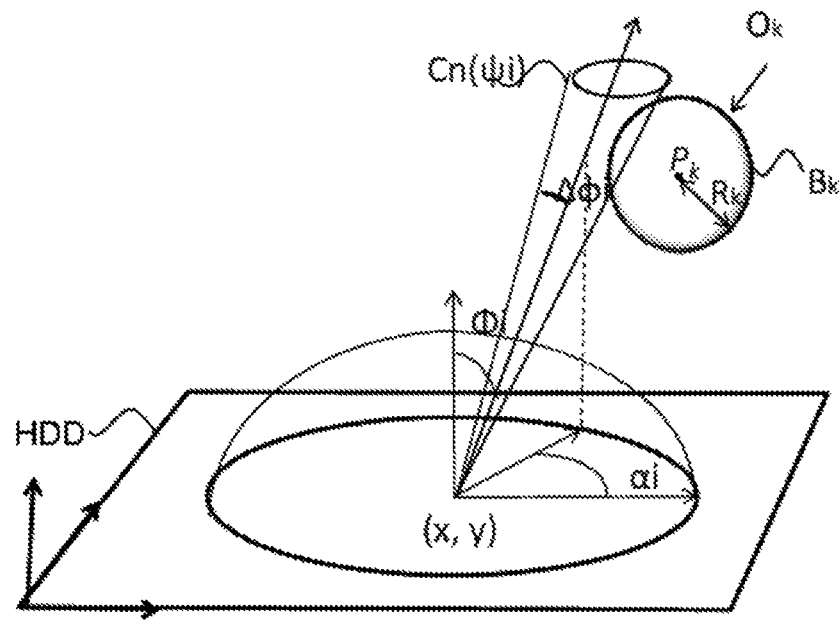
Figure 4:
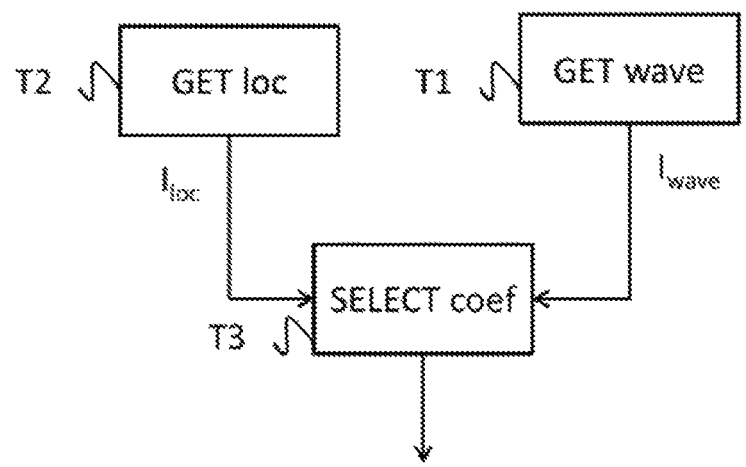
Figure 6:
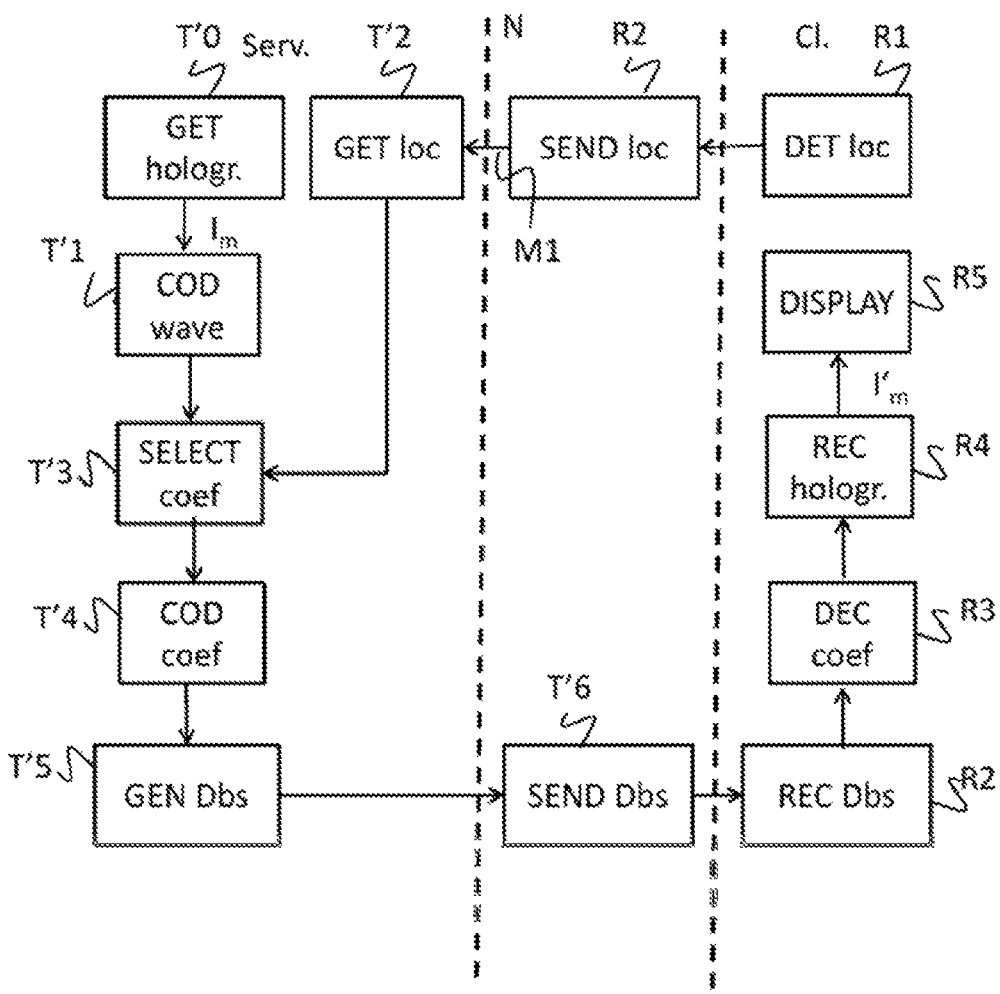
Figure 7:
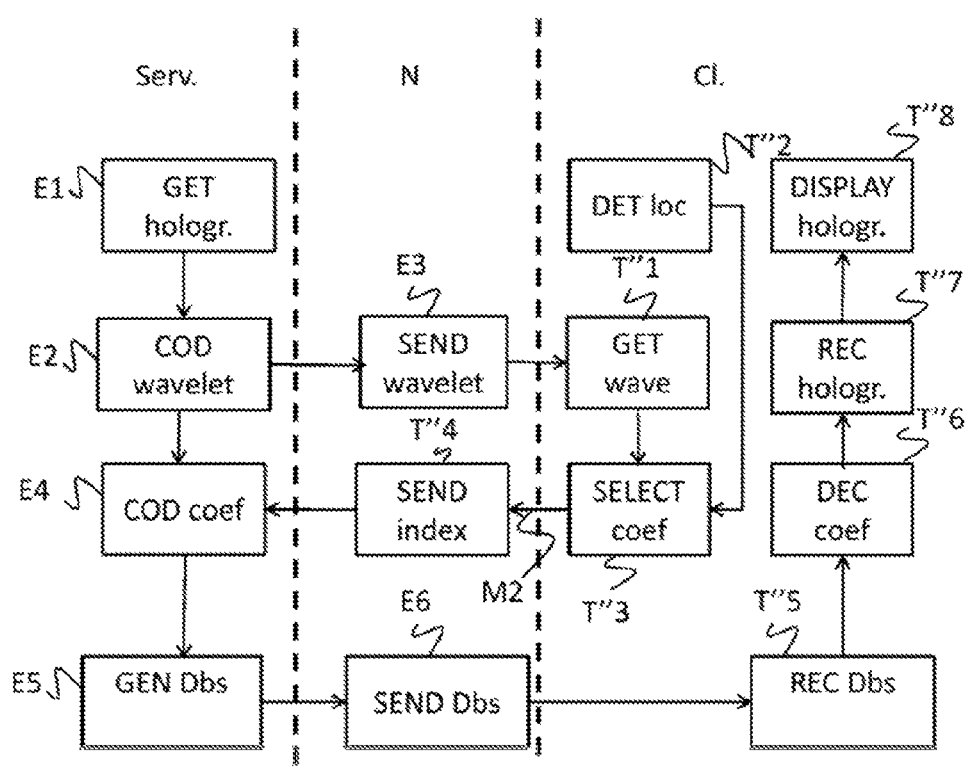
Figure 10:
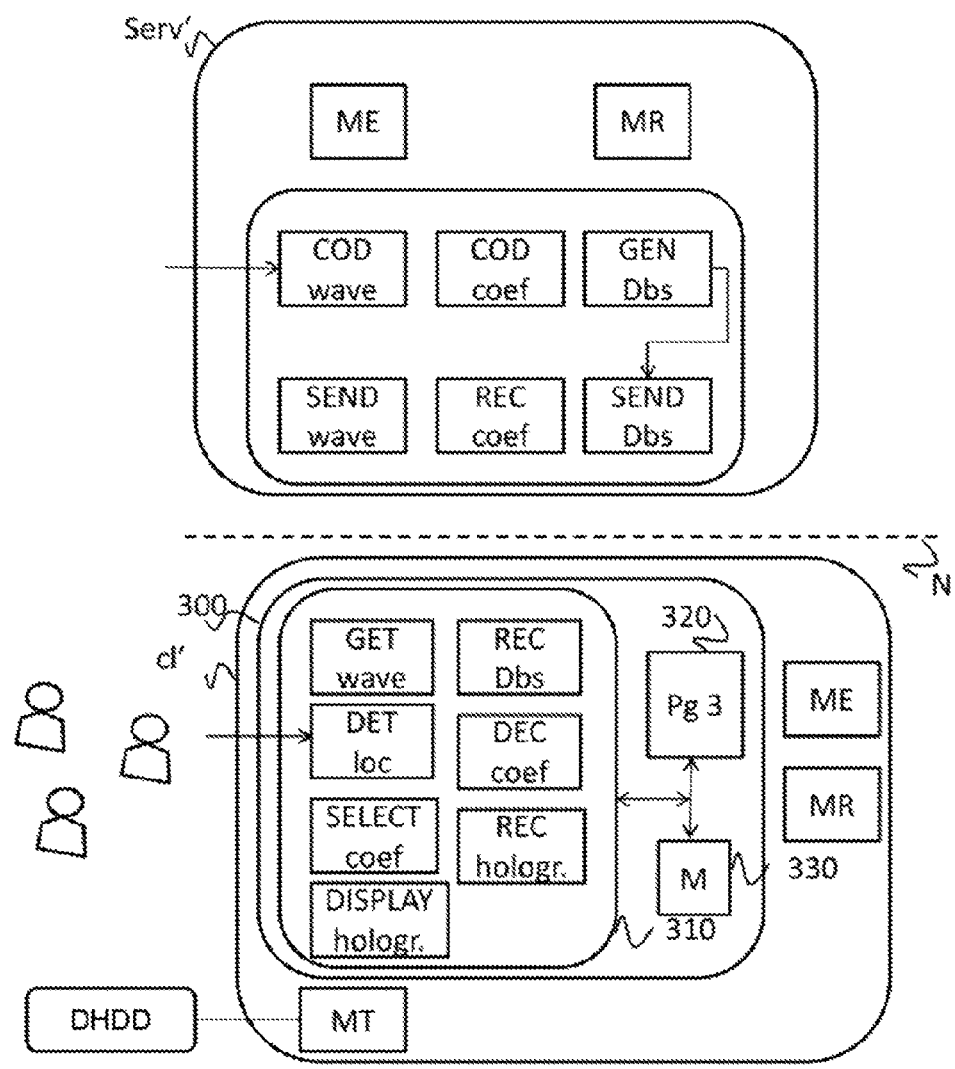

Other advantages and characteristics of the invention will be more clearly apparent on reading the following description of a particular embodiment of the invention, given by way of simple illustrative and nonlimiting example, and the appended drawings, among which:

FIG. 1 presents an exemplary collection of Gabor wavelets;

FIGS. 2a and 2b present in a schematic manner the relation between frequency location of a wavelet and angular direction of the light diffracted by this wavelet;

FIGS. 3a and 3b present in a schematic manner the projection of light diffracted from a point of the display device in a plane perpendicular to this device in the direction of an observer;

FIG. 4 presents in a schematic manner the steps of a method for processing at least one holographic image according to the invention;

FIG. 5 presents in a schematic manner an intersection between a cone of light diffracted by a wavelet from a point of the display device and the position of an observer in a reference frame of this device;

FIG. 6 presents in a schematic manner the steps of a method for processing at least one holographic image, implemented by a server entity according to a first embodiment of the invention;

FIG. 7 presents in a schematic manner the steps of a method for processing at least one holographic image, implemented by a client entity according to a second embodiment of the invention;

FIG. 8 presents in a schematic manner an exemplary hardware structure of a device for processing at least one holographic image according to the invention;

FIG. 9 presents in a schematic manner an exemplary hardware structure of a device for processing at least one holographic image, when it is integrated into a server entity; and FIG. 10 presents in a schematic manner an exemplary hardware structure of a device for processing at least one holographic image according to the invention, when it is integrated into a client entity.

DESCRIPTION OF A PARTICULAR EMBODIMENT OF THE INVENTION

The general principle of the invention relies on the decomposition of a holographic image with the help of a Gabor wavelet basis and on the selection of the wavelets of this basis which contribute to the reconstruction of the sub-hologram visible from the region or regions of location of the observers of a device for displaying the holographic image.

A display device comprising a Spatial Light Modulator SLM, for example an LCD (Liquid Crystal Display) screen, is considered in the description which follows. The SLM is composed of pixels. The set of pixels of the SLM that are necessary for displaying a wavelet constitutes a pixel of the hologram, which will be considered pointlike and will be dubbed "point" subsequently.

We consider a basis of N Gabor wavelets, with N an integer. The properties of Gabor wavelets are known and for example described in the work by D. Gabor, entitled "Theory of Communication", published in 1944.

We also consider a holographic image I. Decomposition into Gabor wavelet coefficients corresponds to a set of scalar products of a function representing the image I by basis functions or wavelets ψi(x,y,σ,θ), that can be expressed in the following manner:

$$\psi_i(x,y,\sigma,\theta) = K \cdot \exp(-\pi\sigma^2(x^2+y^2)) \cdot \exp(\sqrt{2}\pi\sigma \cdot I(x \cdot \cos\theta + y \cdot \sin\theta)) \quad (1)$$

In equation (1), x and y designate the position of a point on the image I, i designates the index of the wavelet $\psi_i$ in the basis, associated with this point, $\theta_i$ an angle indicating a favored direction of decomposition, σ a decomposition level and K a constant which depends on a spatial frequency $f_i$ associated with the wavelet $\psi_i$.

In a reciprocal manner, a point (x,y) of the image I can be associated with each index i of a wavelet.

It will be noted that the decomposition level σ decides the frequency of the wavelet $\psi_i$ which corresponds to the spatial frequency $f_i$.

A holographic image I may therefore be written after this decomposition:

$$I(x,y) = \Sigma_{i,\sigma,\theta} c_{i,\sigma,\theta} \cdot \psi_i(x,y,\sigma,\theta) \quad (2)$$

with $$c_{i,\sigma,\theta} = \int_{-\infty}^{\infty} I(x,y) \cdot \psi_i(x,y,\sigma,\theta_i) dx dy \quad (3)$$

$C_{i,\sigma,\theta}$ is the coefficient, associated with the wavelet $\psi_i$, obtained for the holographic image I at the point (x,y) of this image.

In conjunction with FIG. 1, a collection of Gabor wavelets with 10 values of θ and 10 values of σ is presented by way of example.

Hereinafter, the wavelet basis implemented to decompose the image I comprises a higher number N of wavelets than the collection of FIG. 1, for example equal to 100.

In conjunction with FIG. 2a, we consider the spectrum of frequencies of a Gabor wavelet $\psi_i$ around its central spatial frequency $f_i$ and, in conjunction with FIG. 2b, a direction of emission of the light rays after diffraction of an incident luminous wave through the wavelet $\psi_i$.

It is observed in FIG. 2b that the Gabor wavelet $\psi_i$ gives rise to diffracted light rays which are concentrated around a main emission direction $\theta_i$.

The angle of incidence $\theta_i$ of the light beam diffracted by the wavelet $\psi_i$ is related to the spatial frequency $f_i$ of this wavelet, through the following equation:

$$\sin \theta_i = \lambda f_i \quad (4)$$

where λ is the wavelength of the incident light used, $\theta_i$ the angle of incidence of the light beam, and $f_i$ the spatial frequency of the signal at the point (x,y) corresponding to the index i.

FIG. 2a furthermore illustrates the fact that the spectrum of the wavelet $\psi_i$ is bunched around its frequency $f_i$.

Indeed, if we consider a coefficient $c_i$ corresponding to the decomposition of a holographic pattern over the Gabor wavelet $\psi_i$, its Fourier transform possesses the largest part of its energy in the band [$f_i-a$, $f_i+a$], with a being small.

Starting from equation (4), the value of the parameter a, for a given frequency $f_i$ and a given angular dispersion, is calculated with the help of the following equation:

$$a = \frac{\sin(\Delta\theta - \sin^{-1}(\lambda f)) - \lambda f}{\lambda} \quad (5)$$

with λ wavelength whose value lies between 400 nm and 780 nm.

FIG. 2b illustrates for its part the fact that the light beam diffracted by the Gabor wavelet $\psi_i$ forms a narrow cone Cn($\psi_i$), concentrated around its direction of incidence $\theta_i$.

By using the above equation (4), it is possible to determine, for each wavelet $\psi_i$, the aperture or angular dispersion $\Delta\theta_i$ of this cone, by replacing the frequency $f_i$ by the upper bound $f_i+\alpha$ of the width of the support of the spectrum of the wavelet $\psi_i$ in the following manner:

$$\Delta\theta_i = \sin^{-1}(\lambda(\sigma+\alpha)) - \sin^{-1}(\lambda\sigma) \quad (6)$$

According to the invention, the wavelets of the basis are chosen so as to produce narrow light cones, typically with angular dispersion $\Delta\theta_i$ equal to 1 degree or 0.01745329 radians. Gabor wavelets have characteristic properties which make it possible to satisfy this constraint.

Equation (5) makes it possible to obtain the corresponding value of a.

In conjunction with FIGS. 3a and 3b, we now consider three observers $O_1$, $O_2$, $O_3$ of a holographic display device HDD. This device comprises a spatial light modulator SLM, for example an LCD (Liquid Crystal Display) screen.

The SLM is composed of pixels; the set of pixels of the SLM that are necessary for displaying a wavelet constitutes a pixel of the hologram, which will henceforth be considered pointlike and will be dubbed "point" subsequently.

These three observers have respectively a position $P_1(x_1, y_1)$, $P_2(x_2, y_2)$, $P_3(x_3, y_3)$ in a reference frame of a plane of the display device HDD.

In FIG. 3a, we consider an angle of incidence $\theta_1$, $\theta_2$, $\theta_3$ that must be exhibited respectively by a light ray diffracted by the holographic device so as to be received by one of its observers $O_1$, $O_2$, $O_3$.

In FIG. 3b, we now consider a zone around each of the observers $O_1$, $O_2$, $O_3$, called the encompassing volume, which represents a region of location of its observers for a predetermined time period. It is defined as a connected and convex subset of possible positions for an observer in a reference frame of the display device during the time period considered. For example, this time period begins subsequent to the acquisition of measurements tracking the position of the observers $P_1$, $P_2$, $P_3$.

For example, the encompassing volume of the observer $O_1$ is modeled with the help of the coordinates of his position $P_1$ and a radius $R_1$. This radius can be considered to be an average distance traveled by this observer during the predetermined time period.

In the plane of the display device considered, the region of location of the observer $O_1$ is therefore represented as a disk. In a 3D reference frame, a ball with center $P_1$ and with radius $R_1$ would be considered.

Such a location region considered for an observer therefore represents a set of possible observation positions for this observer. From this set of positions, the observer will see the set of incident light rays liable to be received from the holographic display device at these various points.

In conjunction with FIG. 4, the steps of a method for processing at least one holographic image according to an embodiment of the invention are now presented. We consider a holographic image sequence $SI_m$ acquired by an acquisition module and representative of a 3D scene. This sequence is intended to be rendered on a holographic display device to a plurality of observers.

This sequence of holographic images comprises M images or rasters $I_m$, with M an integer.

Each image $I_m$ of this sequence has previously been decomposed over a basis of N Gabor wavelets, this having led to the obtaining of a representation of each image in the form of a set of N Gabor wavelet coefficients, $\{C_{i,\sigma,\theta}\}_m$.

The method for processing a sequence of holographic images $SI_m$ according to the invention comprises a step T1 of obtaining items of information relating to the wavelet decomposition applied to the images Im of the sequence. Such items of information comprise at least, for each Gabor wavelet $\psi_i$ of the basis used for the decomposition, an angle $\theta_i$ indicating a favored direction of decomposition and $\sigma_i$ a decomposition level associated with this wavelet. As indicated previously, this decomposition level determines the frequency $f_i$ of the wavelet $\psi_i$.

The method also comprises a step T2 of obtaining items of information relating to the location of the observers of the holographic display device on which the holographic image sequence is intended to be rendered.

The viewers $O_k$, with k an integer lying between 1 and K, are located for example with the aid of a system for tracking the position of the head or gaze ("headtracking" or "eyetracking"), which determines for each of them a position $P_k$ in a reference frame of the holographic display device.

In the case where the volume encompassing an observer is modeled by a ball $B_k$ with center $P_k$ and with radius $R_k$, the items of information relating to the location of the observers therefore comprise at least the coordinates, for example cartesian or spherical, of their position $P_k$ in this reference frame and they furthermore comprise a mean radius $R_k$, representative of a mean displacement of the observer Ok during a predetermined period. Taking this mean displacement into account makes it possible to limit the number of updates of the location items of information, by limiting the number of new measurement acquisitions to one per predetermined period.

It is understood that in this way, step T2 is not necessarily repeated before the processing of each new image Im, but that it is implemented with a repetition frequency dependent on the predetermined time period. For example, it could be repeated every second.

According to a first aspect of the invention, this mean radius has the same value for all the observers Ok, thereby amounting to modeling the displacements of all the observers in the same manner for simplicity.

According to a second aspect of the invention, this mean radius has a value specific to each observer and it is chosen all the larger the higher the observer's instantaneous speed.

Of course, other modelings of the volume encompassing an observer can be envisaged, for example in the form of cubes or tiles.

The processing method furthermore comprises a step T3 of selecting a subset of wavelet coefficients as a function of the location items of information $I_{loc}$ and of the wavelet decomposition items of information $I_{wave}$ obtained. This step consists in retaining for a holographic image $I_m$ decomposed in the form of a set of wavelet coefficients $\{C_{i,\sigma,\theta}\}_m$ only the indices of the coefficients corresponding to the wavelets $\psi_i$ which generate, at each point (x,y) of the image rendered on the display device, a light cone having a non-zero intersection with the regions of location of the observers.

A display device HDD on which a point (x,y) has been represented, at the level of which the light cone $Cn(\psi_i)$ corresponding to a wavelet $\psi_i$ is diffracted, is presented by way of example in conjunction with FIG. 5.

The selection of the relevant coefficients for a viewer positioned at $P_k$ can be done in the following manner:

For each wavelet $\psi_i$ associated with a point (x,y) of the display device, with an angle $\theta_i$ representative of a favored direction of decomposition and with a decomposition level $\sigma_i$:

We consider the unit vector u whose azimuth angle $\varphi_i$ and zenith angle $\alpha_i$ in spherical coordinates are respectively $\varphi_i = \sin^{-1}(\lambda\sigma_i)$ and $\alpha_i=\theta_i$.

We consider the angular dispersion $\Delta\varphi$ dependent on the width of the spectrum of the wavelet $\psi_i$, calculated in a prior pass.

The coefficient $c_i$ associated with the wavelet $\psi_i$ is retained if and only if the cone with aperture $\Delta\varphi$ exhibits a non-zero intersection with the ball $B_k$ with center $P_k$ and radius $R_k$. This intersection can be determined in an approximate manner by the following criterion: the coefficient c is retained if and only if $(P_k-(x,y))\wedge u < R_k$ where $\wedge$ designates the vector product.

Of course, if several observers $O_k$ are present, the union $U(B_k)$ of the balls $B_k$ associated with these observers is considered and the coefficient ci is selected provided that it exhibits a non-zero intersection with at least one of the balls $B_k$ of the union U.

According to an applicational variant, the balls centered at $P_k$ can be replaced with cubes or tiles. In this case, the intersection takes place if and only if one of the vertices of the cube or of the tile is in the interior of the cone.

In another applicational variant, the coefficients are selected with the help of a set of points $X_1, \ldots X_{Lk}$, with $L_k$ a non-zero integer, in the ball with center $P_k$ and radius $R_k$ in the following manner:

For each point $X_l$:
Calculate the polar coordinates $\alpha_{x_l}$ and $\beta_{x_l}$ of $X_l$
Select the coefficient Ci whose wavelet $\psi_i$ is associated with the parameters $\theta_i$ and $\sigma_i$ which minimize the term $\sqrt{(\cos^{-1}(\lambda\sigma_i)-\alpha_{x_l})^2+(\theta_i-\beta_{x_l})^2}$ It is understood that the choosing of a set of points $X_1, \ldots X_{Lk}$ is aimed at limiting the number of calculations to be performed so as to select the indices of the wavelets which contribute to light cones that are visible in the volume encompassing the observer, in this example the ball $B_k$. Nonetheless, it is necessary to choose a sufficient number of points $X_1, \ldots X_{Lk}$ in the ball $B_k$ to guarantee that this set of points is representative of the various viewpoints of an observer inside this ball.

On completion of the above-presented processing method according to the invention, a subset of the Gabor wavelet coefficients, comprising the coefficients which are relevant for the reconstruction of the sub-hologram of the holographic image Im visible to the observer or observers of the display device, is therefore obtained for an image $I_m$ of the holographic sequence considered.

In conjunction with FIG. 6, an exemplary implementation of the processing method according to a first embodiment of the invention is now presented. In this example, a server Serv or emitter entity connected to a communication network N is considered. Such an entity is designed to generate a coded data stream from a sequence of holographic images and to transmit it by way of the communication network N to a client or receiver entity Cl.

The server entity Serv implements the method for processing a sequence of holographic images according to the invention. In particular, the following steps are implemented:

In the course of a step T'0, a sequence of holographic images $SI_m$ is obtained. It has been acquired by an acquisition module which may or may not be integrated with the entity Serv.

In the course of a step T'1, the holographic sequence $SI_m$ is represented in the form of a decomposition according to a basis of N Gabor wavelets. A set of N wavelet coefficients is obtained for each point (x,y) of a holographic image Im of the sequence $SI_m$.

The items of information representative of the Gabor wavelets implemented in this decomposition are therefore obtained in the course of this step. This involves for example the parameters $\theta_i, \sigma_1$ which are distinctive of a wavelet $\psi_i$.

In the course of a step T'2, location items of information in respect of the observer or observers of the display device are obtained. In this example, it is assumed that the display device is remote. The location items of information in respect of the observer or observers are therefore received by way of the communication network N originating from the client entity Cl connected to the display device. In the course of a step T'3, a subset of Nm coefficients is selected from the set of N coefficients, with Nm an integer less than N, as a function of the wavelet items of information and location items of information obtained. This selection is done image $I_m$ by image $I_m$.

In the course of a step T'4 the coefficients selected for an image $I_m$ are encoded. In an advantageous manner, for a selected coefficient ci, two items of information are encoded: the index i representative of the wavelet $\psi_i$ to which the coefficient pertains and its value.

The encoding of these two types of item of information is for example implemented with the aid of a zerotree procedure, described in detail in the document entitled "*A new, fast and efficient image codec based on set partitioning in hierarchical trees*", by Said Amir and Pearlman William, published in the journal IEEE Transactions on Circuit and Systems for Video Technology, vol. 6(3), pages 243-250, in June 1996. In the course of a step T'5, a data stream Dbs (data bitstream) is generated from the coded data. It is transmitted in the communication network N in the course of a step T'6.

It will be noted that the encoding step properly speaking could also be implemented prior to the selection step. In this case, the step of generating a data stream would be adapted to pick up those from among the previously coded coefficients that were selected.

The method for reconstructing a holographic image sequence, executed by the client entity Cl on receipt of the data stream Dbs, is now considered.

In the course of a prior step R1, the client entity Cl has determined the location or locations of the observers of the display device to which it is connected. For example it has obtained measurements acquired by position tracking devices placed on the observers, has interpreted them and has then constructed the location items of information Hoc with the help of these measurements. In the course of a step R2, it transmits the location items of information $I_{loc}$, in a signaling message, for example dedicated to the uploading of items of information relating to the coding by the client or decoder entity to the server or coder entity. The signaling message used by the client entity may be for example a signaling message transmitted in a return channel of "back channel" type such as described in the standard MPEG-4 ISO/IEC 14496 specified by the ISO/IEC/JTC1/SC29/WG11 standardization group.

In the course of a step R2, the data stream Dbs is received. The coded data are extracted and then decoded in the course of a step R3 intended to provide the indices and values of the decoded coefficients for a current holographic image Im. In the course of a step R4, a sub-hologram $I'_m$ is reconstructed with the help of the decoded coefficients. One speaks here of a sub-hologram $I'_m$, since only the selected coefficients have been transmitted. The sub-hologram I'm is dispatched to the display at R5.

The embodiment which has just been presented illustrates client-server operation in push mode. The client pushes toward the server location items of information in respect of the observers positioned in front of the display device and the server responds by transmitting the selection of coded coefficients that are relevant for the reconstruction of a sub-hologram visible to the observers, as a function of the position items of information received.

In conjunction with FIG. 7, an exemplary implementation of the processing method according to a second embodiment of the invention is now presented. In this example, it is executed by a client entity Cl' or decoder entity connected to a communication network N'. Such an entity is designed to receive a data stream coded from a sequence of holographic images Slm by a server entity Serv' or encoder and to render a reconstructed sequence of holographic images on a holographic display device.

In the course of a step T"1, items of information relating to the Gabor wavelet basis used to represent the holographic images are received from the server entity Serv'.

It is understood that this step is not necessarily implemented prior to each new operation of selecting wavelet coefficients according to the invention. Indeed, if the wavelet basis used is always the same, it will be executed once and for all.

The step T"2 of determining a location item of information in respect of the observers is similar to step R1 already described. The location items of information Hoc are obtained at the time of this step.

In the course of a step T"3, a subset of Nm wavelet coefficients is selected with the help of the location and wavelet items of information previously obtained.

In the course of a step T"4, the indices of the selected coefficients are transmitted to the server entity Serv' in a signaling message by way of the communication network N'. As mentioned previously, a message of back channel type can advantageously be used for this uploading of items of information to the coder.

Moreover, steps T"5 to T"8 correspond to steps R2 to R4 previously described in conjunction with FIG. 6.

The method for generating a data stream Dbs with the help of a holographic image sequence, executed by the server entity Serv' Cl with the help of the indices of the wavelet coefficients selected by the client entity Cl', is now considered.

Steps E1 of obtaining a sequence of holographic images and E2 of decomposing this sequence over a Gabor wavelet basis correspond to steps T'0 and T'11 already described. In the course of a step E3, items of information relating to the wavelet basis used are transmitted to the client entity cl'. As mentioned previously for step T"1, this step can be implemented once and for all and not be repeated as long as the wavelet basis used is not modified.

In the course of a step E4, the wavelet coefficients are coded. This step corresponds to step T'4 described previously. It can be applied equally well to the set N of coefficients or else to the subset Nm of selected coefficients for a current holographic image Im. In the first case, it is implemented prior to the receipt of the indices of coefficients selected and it is step E5 of generating a data stream which picks up from among the coded coefficients those which correspond to the indices received. In the second case, it is triggered on receipt of the indices and only the selected coefficients are encoded.

In the course of a step E6, the data stream Dbs generated is transmitted to the client entity Cl' by way of the communication network N.

The embodiment which has just been presented illustrates client-server operation in pull mode. The server receives from its client the coefficient indices that the latter needs and constructs a data stream as a function of the indices received.

It will be noted that the invention can be implemented by means of software components and/or hardware components. In this regard, the terms "module" and "facility", used in this document, can correspond either to a software component, or to a hardware component, or else to a set of hardware and/or software components, able to implement the function or functions described for the module or the facility concerned.

An exemplary simplified structure of a device DT 100 for processing at least one holographic image according to the invention is now presented in conjunction with FIG. 8.

The processing device 100 implements the processing method according to the invention, which has just been described in conjunction with FIG. 4. It can equally well be integrated into a server entity or into a client entity.

For example, the device 100 comprises a processing unit 110, equipped with a processor P1, and driven by a computer program $Pg_1$ 120, stored in a memory 130 and implementing the processing method according to the invention.

On initialization, the code instructions of the computer program $Pg_1$ 120 are for example loaded into a RAM memory before being executed by the processor of the processing unit 110. The processor of the processing unit 110 implements the steps of the previously described processing method, according to the instructions of the computer program 120. According to the invention, the device 100 comprises at least a unit GET loc for obtaining a location item of information in respect of the observers of a holographic display device HDD, a unit GET wave for obtaining items of information relating to the Gabor wavelet basis implemented to decompose the sequence of holographic images, a unit SELECT for selecting relevant wavelet coefficients for the reconstruction of the sequence as a function of the location and wavelet items of information obtained.

An exemplary simplified structure of a device 200 for processing at least one holographic image according to the first embodiment of the invention is now presented in conjunction with FIG. 9.

The processing device 200 implements the processing method according to the invention, which has just been described in conjunction with FIG. 6. It is integrated into a server entity Serv.

In this exemplary embodiment, the device 200 furthermore comprises a unit COD coef for coding the wavelet coefficients, a unit GEN Dbs for generating a data stream from the selected coded coefficients and a unit SEND Dbs for transmitting the data stream Dbs obtained.

These units are driven by the processor P2 of the processing unit 210.

The processing device 200 is therefore designed to cooperate with the server entity Serv, in particular with a reception module MR by way of which the location items of information are received from a client entity Cl connected to a display device HDD and an emission module ME by way of which the data stream bts is transmitted to the entity Cl.

The client entity Cl comprises a module DET loc for determining the location items of information in respect of the observers of the display device HDD, an emission module ME able to emit the location items of information in respect of the observer or observers, a module MR for receiving the data stream Dbs emitted by the server entity Serv, a module DEC coef for decoding the coefficients of the stream, a module REC for reconstructing the holographic image and a module DISPLAY for controlling display of the reconstructed holographic image by the holographic display device HDD to which it is connected by way of the module MT.

An exemplary simplified structure of a device 300 for processing at least one holographic image according to a second embodiment of the invention is now presented in conjunction with FIG. 10. This device implements the processing method which has just been described in conjunction with FIG. 7. It is integrated into a client entity Cl'.

For example, the device 300 comprises a processing unit 310, equipped with a processor P3, and driven by a computer program $Pg_3$ 320, stored in a memory 130 and implementing the processing method according to the invention.

On initialization, the code instructions of the computer program $Pg_3$ 320 are for example loaded into a RAM memory before being executed by the processor of the processing unit 110. The processor of the processing unit 310 implements the steps of the processing method described previously in conjunction with FIG. 7, according to the instructions of the computer program 120. According to the invention, the device 300 comprises at least the units of the device 100 which have just been described.

In an advantageous manner, the device 300 furthermore comprises a unit REC for receiving a data stream Bts transmitted by a server entity Serv', a unit DEC for decoding the wavelet coefficients received in the stream Bts, a unit REC hologr for reconstructing a sub-hologram with the help of the decoded coefficients and a unit DISPLAY for displaying the reconstructed sub-hologram on a holographic display device HDD connected to the client entity Cl'.

These units are driven by the processor P3 of the processing unit 310.

The processing device 300 is therefore designed to cooperate with the client entity Cl' and, in particular the following modules of this module:
  a module for connecting to the communication network N, by way of which it transmits the indices of the selected coefficients and it receives the data stream Bts
  a module for connecting to the display device HDD by way of which it controls the displaying of the reconstructed sub-hologram.

The server entity Serv' comprises a reception module MR able to receive the indices of the wavelet coefficients selected by the client entity Cl', a module COD coef for coding the selected coefficients, a module GEN Dbs for generating a data stream Bds, a module ME for emitting the data stream destined for the client entity Cl'.

Although the present disclosure has been described with reference to one or more examples, workers skilled in the art will recognize that changes may be made in form and detail without departing from the scope of the disclosure and/or the appended claims.

The invention claimed is:

1. A method for processing a sequence of holographic images, with a view to its rendition by a holographic display device to at least one observer, wherein, for a holographic image decomposed over a Gabor wavelet basis into a set of wavelet coefficients, the method comprises the following acts performed by a processing device:
   obtaining items of information representative of the decomposition over the Gabor wavelet basis;
   obtaining items of information representative of a location of said at least one observer in a reference frame of the display device;
   the items of information representative of a location of said at least one observer comprising parameters characteristic of a connected and convex subset of positions of the observer, termed an encompassing volume; and
   selecting a subset of wavelet coefficients as a function of the wavelet items of information and of the location items of information obtained, said selecting comprising the following sub-acts:
      determining an angular direction of emission and of an angular dispersion of a light cone produced by a Gabor wavelet at a point of the holographic image in a reference frame of the display device;
      identifying the cones having a non-zero intersection with at least the encompassing volume of said at least one observer; and
      selecting wavelets corresponding to the identified cones.

2. The method for processing a sequence of holographic images as claimed in claim 1, wherein the location items of information are received in a signaling message emitted by an entity designed to determine said location items of information.

3. The method for processing a sequence of holographic images as claimed in claim 2, wherein the method comprises an act of coding the wavelet coefficients with the aid of a tree of "zero-tree" type, according to which a wavelet coefficient is coded by an index representative of the wavelet in the wavelet basis and a value of the coefficient and a step of generating a data stream, comprising for a selected coefficient, said index and said value.

4. The method for processing a sequence of holographic images as claimed in claim 3, wherein, for a following image, the coded value of a selected coefficient comprises a variation with respect to the coded value for the previous image.

5. The method for processing a sequence of holographic images as claimed in claim 1, wherein the method comprises an act of emitting a signaling message comprising the indices of the selected wavelet coefficients destined for a server entity able to generate a data stream coding said coefficients and an act of receiving the data stream coding the selected subset of wavelet coefficients originating from the server entity.

6. The method for processing a sequence of holographic images as claimed in claim 5, wherein, subsequent to the obtaining of new location items of information, the act of selecting a subset of coefficients is repeated and the emitting act emits a new signaling message comprising the indices of the coefficients added to the subset and the indices of the coefficients deleted from the subset.

7. A device for processing a sequence of holographic images with a view to its rendition on a holographic display device to at least one observer, wherein said device comprises:
   a non-transitory computer-readable medium comprising instructions stored thereon;
   a processing unit configured by the instructions to:
      obtain items of information representative of the decomposition over the Gabor wavelet basis;
      obtain items of information representative of a location of said at least one observer in a reference frame of the display device, the items of information representative of a location of said at least one observer comprising parameters characteristic of a connected and convex subset of positions of the observer, termed an encompassing volume;
      select a subset of wavelet coefficients as a function of the wavelet items of information and of the location items of information obtained, said selecting comprising:
         determining an angular direction of emission and an angular dispersion of a light cone produced by a Gabor wavelet at a point of the holographic image in a reference frame of the display device;
         identifying the cones having a non-zero intersection with at least the encompassing volume of said at least one observer; and
         selecting the wavelets corresponding to the identified cones.

8. The device of claim 7, wherein the processing unit is further configured by the instructions to:
   code a sequence of holographic images with a view to its transmission and to its rendition to the at least one observer on the holographic display device, wherein coding comprises:
      coding the wavelet coefficients with the aid of a tree of a "zero-tree" type, a wavelet coefficient being coded by an index representative of the wavelet in the wavelet basis and a value of the coefficient;
      generating a data stream comprising, for a selected coefficient, said index and said value.

9. The device of claim 7, wherein the device further comprises:
   an emission module configured to transmit the data stream in a communication network; and
   a reception module configured to receive a carrier signal bearing a signaling message comprising the location items of information in respect of said at least one observer.

10. A device for decoding a holographic data stream representative of a sequence of holographic images with a view to its to its rendition to at least one observer on a holographic display device, wherein the decoding device comprises:
   a non-transitory computer-readable medium comprising instructions stored thereon;
   a processing unit configured by the instructions to:
      obtain items of information representative of the decomposition over the Gabor wavelet basis;
      obtain items of information representative of a location of said at least one observer in a reference frame of the display device, the items of information representative of a location of said at least one observer comprising parameters characteristic of a connected and convex subset of positions of the observer, termed an encompassing volume;
      select a subset of wavelet coefficients as a function of the wavelet items of information and of the location items of information obtained, said selecting comprising:

determining an angular direction of emission and an angular dispersion of a light cone produced by a Gabor wavelet at a point of the holographic image in a reference frame of the display device;

identifying the cones having a non-zero intersection with at least the encompassing volume of said at least one observer; and selecting the wavelets corresponding to the identified cones decoding of the wavelet coefficients with the aid of a tree of a "zero-tree" type, a wavelet coefficient being coded by an index representative of the wavelet in the wavelet basis and a value of the coefficient;

reconstruction of an image of the sequence, with the help of the decoded coefficients comprising, for a selected coefficient, said index and said value.

11. The device of claim 10, wherein the device further comprises:

a reception module configured to receive location items of information in respect of said at least observer in a reference frame of the holographic display device, and a transmitting module, which transmits the reconstructed image to said display device.

12. A non-transitory computer-readable medium comprising a computer program stored thereon, comprising instructions for processing a sequence of holographic images, with a view to its rendition by a holographic display device to at least one observer, when the instructions are executed by a processing unit, wherein, for a holographic image decomposed over a Gabor wavelet basis into a set of wavelet coefficients, and wherein the instructions configure the processing unit to perform acts of:

obtaining items of information representative of the decomposition over the Gabor wavelet basis;

obtaining items of information representative of a location of said at least one observer in a reference frame of the display device; the items of information representative of a location of said at least one observer comprising parameters characteristic of a connected and convex subset of positions of the observer, termed an encompassing volume; and selecting a subset of wavelet coefficients as a function of the wavelet items of information and of the location items of information obtained, said selecting comprising the following sub-acts:

determining an angular direction of emission and of an angular dispersion of a light cone produced by a Gabor wavelet at a point of the holographic image in a reference frame of the display device;

identifying the cones having a non-zero intersection with at least the encompassing volume of said at least one observer; and selecting wavelets corresponding to the identified cones.

* * * * *